(12) United States Patent
Kangas

(10) Patent No.: US 7,117,380 B2
(45) Date of Patent: Oct. 3, 2006

(54) APPARATUS, SYSTEM, AND METHOD FOR AUTONOMIC POWER ADJUSTMENT IN AN ELECTRONIC DEVICE

(75) Inventor: Paul Daniel Kangas, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 10/677,153

(22) Filed: Sep. 30, 2003

(65) Prior Publication Data

US 2005/0071698 A1    Mar. 31, 2005

(51) Int. Cl.
*G06F 13/14* (2006.01)
*H04N 7/16* (2006.01)

(52) U.S. Cl. ............... 713/320; 713/310; 713/322; 713/323; 713/324; 713/330; 713/340

(58) Field of Classification Search ........ 713/320–324, 713/330, 340
See application file for complete search history.

(56) References Cited

U.S. PATENT DOCUMENTS

| | | | |
|---|---|---|---|
| 5,396,443 A | 3/1995 | Mese et al. ............... 364/707 |
| 5,548,764 A | 8/1996 | Duley et al. .............. 395/750 |
| 5,550,366 A | 8/1996 | Roustaei ................... 235/462 |
| 5,880,719 A | 3/1999 | Kikinis .................... 345/212 |
| 5,936,608 A * | 8/1999 | Springer ................... 345/690 |
| 6,269,449 B1 | 7/2001 | Kocis ....................... 713/310 |
| 6,307,384 B1 * | 10/2001 | Havey et al. .............. 324/662 |
| 6,330,676 B1 | 12/2001 | Kelsey ..................... 713/200 |
| 6,374,145 B1 | 4/2002 | Lignoul .................... 700/17 |
| 6,418,536 B1 | 7/2002 | Park ......................... 713/323 |
| 6,801,811 B1 * | 10/2004 | Ranganathan et al. ...... 700/22 |
| 2002/0099956 A1 * | 7/2002 | Suzuki ...................... 713/200 |
| 2003/0146897 A1 * | 8/2003 | Hunter ...................... 345/102 |
| 2004/0175020 A1 * | 9/2004 | Bradski et al. ............. 382/103 |

OTHER PUBLICATIONS

"Human Centered Dynamic Power Management Method," *IBM Technical Disclosure Bulletin*, Jan. 1996, pp. 143-144.

* cited by examiner

*Primary Examiner*—A. Elamin
(74) *Attorney, Agent, or Firm*—Kunzler & Associates

(57) ABSTRACT

An apparatus, a system, and a method are provided for autonomic power adjustment in an electronic device. The apparatus, system, and method include a collector configured to collect indicia of a user's body position in relation to an electronic device for a user who maintains close proximity to the electronic device. A determination module is provided that determines a power state for the electronic device based on the indicia. A power control module selectively adjusts power supplied to subsystems of the electronic device to transition to the determined power state.

23 Claims, 7 Drawing Sheets

400

| Power State | Description |
|---|---|
| L1 | System mostly OFF - Only power management unit and presence sensors powered. |
| L2 | All sensors & central processing subsystem powered. |
| L3 | Machine communication devices powered. |
| L4 | Non-volatile storage devices powered. |
| L5 | Human input devices powered and fully functional. |

| Anatomical State | Characteristic |
|---|---|
| Present | Live, Body |
| Study | Live, Body, Eyes Focused |
| Interrupt | Live, Body, Eyes Diverted |
| Working | Live, Body, Eyes Focused, Hands Near |

FIG. 4B

APPARATUS, SYSTEM, AND METHOD FOR AUTONOMIC POWER ADJUSTMENT IN AN ELECTRONIC DEVICE

BACKGROUND OF THE INVENTION

1. Field of the Invention

The invention relates to electronic devices. Specifically, the invention relates to apparatus, systems, and methods for conserving power used by an electronic device.

2. Description of the Related Art

Conventional users have high expectations for today's electronic devices. The user expects their computer, Personal Digital Assistant (PDA), laptop, tablet, game device, and other electronic device to provide a bright, vivid, color screen, a highly responsive processor, and a high quality stereo sound. These features generally consume large amounts of power.

Even if power is readily available, such as when using a conventional power outlet, certain users also expect the electronic device to conserve power as much as possible. Power conservation is particularly important for portable electronic devices such as laptops, PDAs, tablets, and the like. Batteries for portable electronic devices are unable to provide bright screens and highly responsive processors for more than a few hours before the batteries are exhausted. Short battery life can severely limit the portability of a portable electronic device.

Accordingly, power management systems have been developed, particularly for portable electronic devices such as laptops, which extend the useable life of the batteries. Generally, these power management systems reduce or turn off power flow to certain subsystems of the electronic device. Typically, the power is reduced or shut-off in response to inactivity of the subsystem. For example, if no files have been accessed for a predetermined length of time, the disk drive(s) may be shut-off or the platters of the disk drive(s) may be allowed to spin-down. Similarly, if an Input/Output (I/O) device such as a keyboard, mouse, touch screen, or the like has not registered an input from a user for a period of time, high power consumption subsystems and/or circuits may be powered down.

Conventional power management systems use internal timers which begin counting down once there is a lack of input from a user or lack of activity for certain subsystems. Generally, to avoid constant powering up and powering down of subsystems, the timers are relatively long (typically 1 to 5 minutes) to account for normal user inactivity in relation to the electronic device. However, if a user is not even in close enough proximity to use the electronic device, the delay until the timer expires unnecessarily wastes power.

In addition, lack of input from a user may not mean the user is not using the electronic device. For example, a user may be studying a complex figure or reading a large quantity of text on the display such that a timer expires and the power management system dims or shuts down the display. Such behavior can quickly annoy a user and may cause a user to increase the timers, which may waste more power when the user is not present.

Conventional power management systems manage power based on the presence or absence of a user. Generally, in these systems, some form of presence sensor detects whether a user is in close proximity to the electronic device. If so, the power management system may continue to power certain subsystems, even if a timer has expired.

Unfortunately, the presence or absence of a user does not provide sufficient information for effective power management. For example, a user may be positioned in front of a laptop at his/her desk studying documents instead of using the computer. In such an instance, conventional presence detection oriented power management devices continue to power subsystems such as an LCD display, even though the user is not viewing the display.

In addition, conventional power management systems, both timer based and presence detection oriented, generally transition between a full power state and minimal power state (only presence sensors powered). Such a transition incurs a delay when the subsystems are powered up or powered down. This delay is referred to herein as latency, and may range from several seconds to a couple of minutes. Users have come to expect an immediate response from electronic devices, and latency delays of several seconds may cause users to avoid or disable such power management systems.

Furthermore, as portable electronic devices are carried about and used, power management systems that rely on presence detection may incorrectly register the presence of a user. For example, as a PDA or tablet is carried, a user's hand may be incorrectly interpreted as a user prepared to interface with the device. Consequently, power may be needlessly wasted.

Accordingly, what is needed is an apparatus, system, and method for adjusting power use in an electronic device naturally, such that power is shut-off and restored to subsystems in response to movements of a user in relation to the electronic device. The apparatus, system, and method should adjust the power level between a plurality of power levels to minimize power-up and power-down latency. In addition, the apparatus, system, and method should manage power based on indications from a user beyond simple presence or absence to optimize power use. The apparatus, system, and method should adapt power management to the use habits of the user.

BRIEF SUMMARY OF THE INVENTION

The present invention has been developed in response to the present state of the art, and in particular, in response to the problems and needs in the art that have not yet been met for power adjustment in electronic devices. Accordingly, the present invention has been developed to provide an apparatus, system, and method for adjusting power in electronic devices that overcome many or all of the above-discussed shortcomings in the art.

An apparatus according to the present invention includes a collector, a determination module, and a power control module. The collector collects indicia of a user's body position in relation to an electronic device for a user who maintains close proximity to the electronic device. The indicia represent various anatomical states of a user in various body positions. The determination module determines a suitable power state for the electronic device based on the indicia. The power control module adjusts power supplied to subsystems of the electronic device to transition the electronic device to the determined power state.

In certain embodiments, the determination module may select a power state from a plurality of hierarchical power states such that the determination module may select a higher power state, a lower power state, or a lowest power state based on the indicia. In one embodiment, the determination module measures a time interval that a user maintains a body position and selects a power state such that a latency period associated with the power state is less than the measured time interval. The time interval preferably measuring a period of user inactivity.

In one embodiment, the collector polls a plurality of sensors to collect indicia of a user's body position. Alternatively, the collector may receive signals from a plurality of sensors representative of the indicia. The collector is configured to collect indicia for a plurality of body positions including the focusing of a user's eye on a display device coupled to the electronic device.

A system of the present invention is provided for power adjustment. The system includes a display, a human input device, a processing subsystem, a power regulator, one or more sensors, a collector, a determination module, and a power control module. The collector, determination module, and power control module may operate in a manner similar to those described above in regard to the apparatus. The power regulator controls a power supply provided to the display, human input device, and processing subsystem. The sensors detect one or more characteristics of a user's body position.

In certain embodiments, the sensors comprise a digital camera that captures a series of images of the user. The collector analyzes the images and identifies control points on a user in the images. The collector then determines indicia of a user's body position based on the control points.

A method of the present invention is also presented for power adjustment in an electronic device. In one embodiment, the method includes collecting indicia of a user's body position in relation to an electronic device. Next, a power state is determined for the electronic device based on the indicia. Finally, the power supplied to subsystems of the electronic device is selectively adjusted to transition to the determined power state. The indicia may represent a plurality of anatomical states of a user and a power state may be selected from a plurality of hierarchical power states.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4A is a chart illustrating a plurality of power levels which certain embodiments of the present invention may enter;

FIG. 4B is a chart illustrating a plurality of anatomical states represented by various body positions of a user in certain embodiments of the present invention;

DETAILED DESCRIPTION OF THE INVENTION

Figure 1:
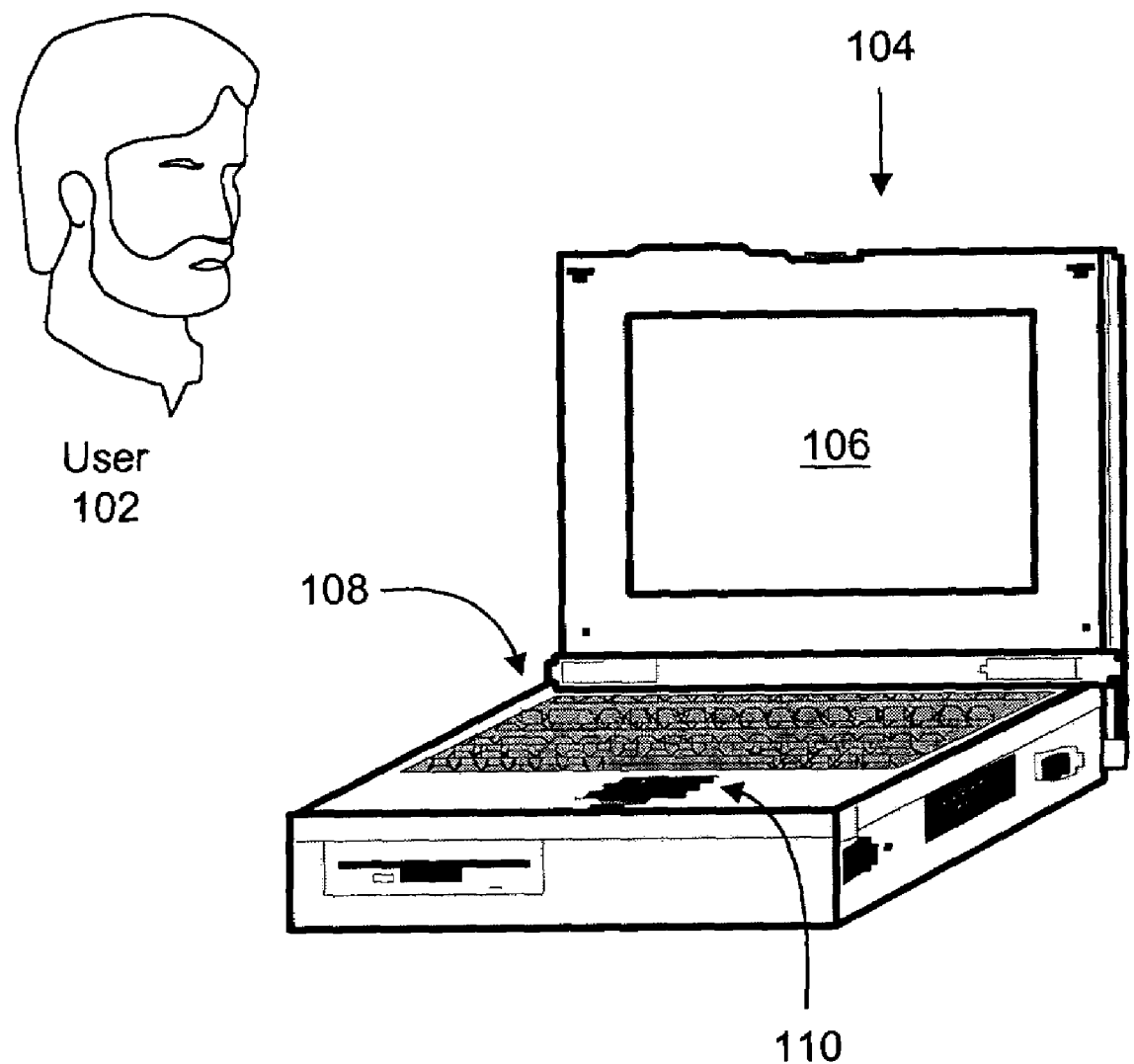
FIG. 1 is a diagram illustrating an electronic device suitable for implementing one embodiment of the present invention.

It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates a user 102 positioned in close proximity to an electronic device, such as a laptop computer 104. Laptops are notorious for having very limited battery life. One major consumer of power in a laptop 104 is the display 106. Typically, the display 106 uses LCD technology with a backlight to provide the brightness expected by the user 102.

As mentioned above, conventional power management based strictly on whether or not a user is in close proximity to an electronic device does not optimally conserve power and provide rapid power restoration in response to user actions. For example, students in many classrooms and lecture halls use laptop computers 104 to take notes. The user 102 may sit for extended periods of time in front of the laptop 104 without using the laptop 104. Strictly presence detection systems would continue to fully power the laptop 104.

Detecting user proximity in conjunction with timers may also be inadequate because of the extended delay before the laptop subsystems are powered to an operational level. In addition, timers may shutdown a display 106, for example, when a user is studying the display 106 but not providing input to the laptop 104 through a keyboard 108 or other human input device, such as a mouse (not shown) or pointer 110.

One embodiment of the present invention may be implemented in the laptop 104 such that power management is autonomic. As used herein, "autonomic" means that the power management system regulates the power in a manner that is natural and expected without overt user involvement. With autonomic power management, the user may not be aware that power management is happening.

The power management system regulates power such that the electronic device is fully operational when needed yet saves the most power possible when the user is present but not using one or more subsystems of the electronic device. For example, if the user 102 stares at the display, storage devices, such as hard drives, may be shutdown while the display is lit. If the user 102 looks away from the display, the display may immediately darken as power is reduced. However, when the user 102 re-focuses on the display, the display may immediately illuminate for use.

Figure 2:
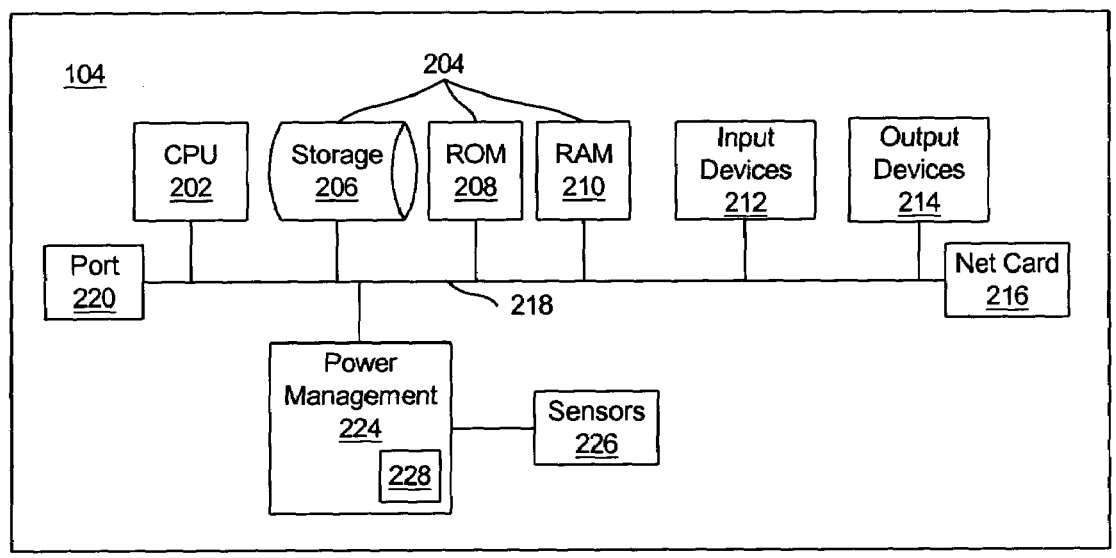
FIG. 2 is a schematic block diagram illustrating an electronic device suitable for implementing one embodiment of the present invention.

FIG. 2 illustrates a schematic block diagram of one embodiment of an electronic device in accordance with the present invention. In certain embodiments, the electronic device is a laptop computer 104. Nevertheless, the device may constitute any type of electronic equipment, including a tablet computer, a PDA, and the like.

The device, hereinafter by way of example a laptop 104 may include a processor or CPU 202. The CPU 202 may be operably coupled to one or more memory devices 204. The memory devices 204 may include a non-volatile storage device 206 such as a hard disk drive or CD ROM drive, a read-only memory (ROM) 208, and a random access volatile memory (RAM) 210.

The laptop 104 in general may also include one or more input devices 212 for receiving inputs from a user 102 or from another device. The input devices 212 may include a keyboard 108, pointing device 110, touch screen, or other similar human input devices. Similarly, one or more output devices 214 may be provided within or may be accessible from the laptop 104. The output devices 214 may include a display 106, speakers, or the like. A network port such as a network interface card 216 may be provided for connecting to a network.

Within an electronic device such as the laptop 104, a system bus 218 may operably interconnect the CPU 202, the memory devices 204, the input devices 212, the output devices 214, the network card 216, and one or more additional ports 220. The ports 220 may allow for connections with other resources or peripherals, such as printers, digital cameras, scanners, and the like.

The laptop 104 also includes a power management unit 224 in communication with one or more sensors 226. The power management unit 224 autonomically adjusts the power level to one or more subsystems of the laptop 104. Of course, the subsystems may be defined in various manners. In the depicted embodiment, the CPU 202, ROM 208, and RAM 210 may comprise a processing subsystem. Non-volatile storage 206 such as disk drives, CD-ROM drives, DVD drives, and the like may comprise another subsystem. The input devices 212 and output devices 214 may also comprise separate subsystems.

The power management unit 224 may receive signals from one or more sensors 226 configured to detect characteristics about a user's body position. The sensors 226 may comprise infrared sensors, radio sensors, motion sensors, heat sensors, carbon dioxide sensors, biometric eye scanners, audio sensors, still or video camera sensors, or the like.

The sensors 226 are configured to detect a plurality of characteristics about a user's body position with more particularity than merely whether or not a user is in close proximity to the laptop 104. The sensors 226 may be special purpose hardware devices or may be integrated with other devices, such as a microphone that also serves as an audio sensor or a digital camera that also serves as a motion detector.

In response to information from the sensors 226, the power management unit 224 adjusts the power level of one or more subsystems of the laptop 104. In one embodiment, the power management unit 224 controls a power regulator 228. The power regulator 228 may comprise an inverter or other electrical switch which enables the power supply provided to the various subsystems to be adjusted between completely off and having a full function power supply.

FIG. 2 illustrates the power management unit 224 as a separate unit. However, those of skill in the art will recognize that the power management unit 224 may be implemented as software or microcode within the RAM or ROM of the laptop 104. Similarly, the sensors 226 may be integrated with, or external to, the laptop 104.

Figure 3:
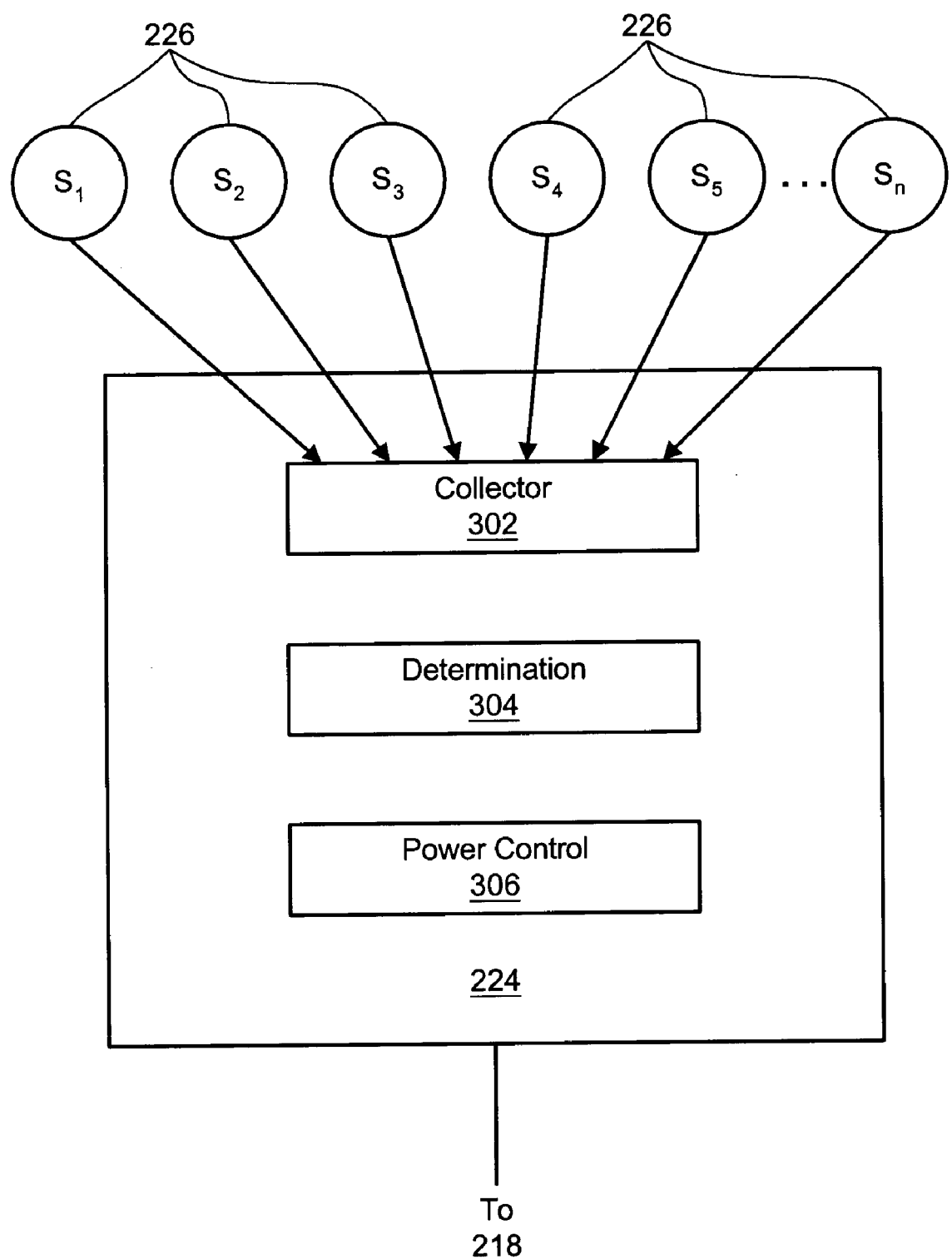
FIG. 3 is a schematic block diagram illustrating one embodiment of an apparatus in accordance with the present invention.

Referring now to FIG. 3, the power management unit 224 is described in more detail. The power management unit 224 includes a collector 302, a determination module 304, and a power control module 306. In one embodiment the collector 302 communicates directly with the sensors 226. The collector 302 collects indicia of a user's body position in relation to the display 106 and/or a human input device such as a keyboard, 108. The sensors 226 may detect a variety of characteristics about a user. The characteristics may indicate anatomical characteristics of a user 102 as well as chemical and/or biological characteristics. For example, one sensor 226 may detect whether a user 102 is focusing his/her eyes on the display 106. Another sensor 226 may detect whether carbon dioxide levels around the electronic device have increased to a level consistent with a human user 102 being present.

Still another sensor 226 may detect how a user's hands and arms are positioned. This sensor 226 may detect not only whether the hands are near a keyboard 108 or other human input device, but also whether the hands are positioned such that normal input may commence. For example, the sensor 226 may comprise an infrared sensor configured to determine a user's hand geometry. If the hands are positioned for typing, the hand geometry may indicate this. If not, the hands may be near the keyboard 108, but the user 102 may not be prepared to enter any data. In one embodiment, if the hands or arms are folded, the sensor may provide indicia of such a body position to the collector 302. Folded hands or arms may indicate the user 102 is concentrating and not prepared to enter any data.

In certain embodiments, the collector 302 collects indicia of body position from a plurality of sensors 226. These indicia are used together to determine which subsystems should be operational such that the user 102 may commence interacting with the electronic device 104. For example, hand sensors 226 may detect that the hands are properly positioned over the keyboard 108 and eye sensors 226 may detect that the user 102 is focusing his/her eyes on something other than the display 106. Consequently, power to the keyboard 108 and its associated circuits may be supplied, while power to the display 106 is reduced or shut off.

Preferably, the collector 302 collects and organizes the indicia from a plurality of sensors 226. The collector 302 may periodically poll the sensors 226 for the indicia. Alternatively, the sensors 226 may dynamically report the indicia in response to a change in a characteristic being detected. For example, the motion sensor 226 may continuously monitor for motion and send a signal to the collector 302 when motion is detected.

The collector 302 communicates the indicia to the determination module 304. In one embodiment, the indicia comprise parameter values that are provided to the determination module 304. Of course, the indicia may have various other formats and configurations.

The determination module 304 reviews the indicia and determines a proper power state in accordance with the indicia. The determination module 304 includes suitable conditional logic to select a power state such that the most power is saved and the laptop 104 returns to full operation from a power saving state within the shortest latency. Once the determination module 304 selects a power state, the power control module 306 activates the proper switches, inverters, and other electrical components to transition the electronic device, or laptop 104, to the determined power state.

Latency, as used herein, means the period of time required for an electronic device to transition to another power state which uses more or less power than the current power state. Latency may include initialization processes as well as self-diagnostic tests. It is desirable that latency in powering up an electronic device be minimized, because the user 102 may be waiting for the computer to power up. The present invention also considers latency in powering down the electronic device. Because the user 102 may still be present, it is desirable that the electronic device respond quickly when the user indicates an intention to use certain subsystems.

Preferably, the determination module 304 is configured to select from a plurality of power states. A power state refers to the number and kinds of subsystems that have an operational power supply. In certain embodiments, subsystems may include power states in which power is reduced but not completely shut off. Power states are described in more detail below. By utilizing a plurality of power states and detecting more information about a user's body position, latency can be minimized through selection of an appropriate power state.

FIG. 4A illustrates a chart 400 listing a plurality of power states that may be entered by one embodiment of the present invention. Preferably, a power management unit 224 may adjust the power supply such that the electronic device enters a plurality of hierarchical power states. Each power state in the hierarchy may use more power and provide more functionality than the next lowest power supply. Power states are listed in the chart 400 with the power state using the least amount of power first and the power state that uses the most power listed last. Certain embodiments may include more or fewer power states than the five illustrated.

In the illustrated chart, the first power state (L1) listed indicates that power to the electronic device, laptop 104, is substantially off. The only subsystems that are powered are the power management unit 224 and sensors 226 required to detect the presence of a user 102.

In addition to the powered systems and circuits of L1, the next power state (L2) may include power to all sensors 226 and a central processing subsystem. The central processing subsystem may include the CPU 202 and memory devices 204. In addition to the powered systems and circuits of L1 and L2, the next power state (L3) may include power to machine communication devices such as a modem, a network card 216, or the like.

In addition to the powered systems and circuits of L1, L2, and L3, the next power state (L4) may include power to non-volatile storage devices 206 such as disk drives and optical media drives. Of course certain devices may include internal power management controls. For example, although powered, the disk drive may not spin-up the drive until data is requested.

The L4 power state may also include power to peripherals such as scanners, digital cameras, and printers. In one embodiment, the L4 power state may include power to all devices connected to a communication port that powers connected devices. For example, the L4 power state may power all controllers and/or hubs connected to a Universal Serial Bus (USB) port. In one aspect, the L4 power state includes power to a display device 106, though the backlight may be turned off to conserve power.

The last power state (L5) is a power state in which all circuits and subsystems required for full interaction with a user 102 are powered. Consequently, the human input devices, such as a keyboard 108 and mouse 110, are powered. In addition, the backlight of the display device 106 is lit such that the laptop 104 is fully operational.

As discussed above, the determination module 304 determines a power state based on indicia of a user's body position. In one embodiment, certain characteristics about a user are combined to form the indicia. Certain indicia are indicative of a particular anatomical state of the user.

FIG. 4B illustrates a chart 410 of anatomical states corresponding to certain characteristics according to one embodiment. Preferably, the present invention includes indicia representative of one of a plurality of anatomical states that are associated with different user body positions. Of course, various other anatomical states may be defined and other characteristics may be measured regarding a user 102 that is present in close proximity to the electronic device 104.

In one embodiment, four different characteristics may be determinable using the sensors 226, either alone or in combination. First, a presence detection sensor 226 may detect that an object in the general shape of a human body is in close proximity to the electronic device 104. The same sensor 226 may also indicate whether the main portion of the object is leaning toward, or away from, the electronic device 104.

Another sensor 226 may detect whether the object that appears to be a body is in fact living. This sensor 226 may detect breathing, for example, by measuring a marked increase in the level of carbon dioxide near the electronic device 104. Such a sensor avoids power consumption if the electronic device 104 is being carried or is placed facing a wall, a brief case, or the like. Similarly, people casually passing by the electronic device 104 will not cause the device 104 to transition to a higher power level, unless a person stops at the electronic device 104.

A third characteristic is whether a user 104 is actually viewing a display 106. One or more sensors 226 for this characteristic may detect whether or not a user's eye is focused on the display 106. Such a sensor 226 may comprise a biometric retinal, or eye scanner. The fourth characteristic is whether a user 104 has his/her hands near the keyboard 108 or other human input device.

In certain embodiments, the sensor 226 detects whether any user's eyes are directed toward the display 106. In another embodiment, the sensor 226 may register only whether or not a particular user's eyes are directed at the display 106. Consequently, certain embodiments may dim the display 106 unless a specific user 102 is actually viewing the display 106. In this manner, the present invention may be used to provide added privacy for a user 102 of the electronic device.

Chart 410 illustrates, in one embodiment, how certain combinations of characteristics may be combined to define distinct anatomical states indicative of the expected level and type of interaction between the user 102 and an electronic device, such as a laptop 104. The first anatomical state is presence. The corresponding characteristics are a body in close proximity that is living.

The next anatomical state is when a user 102 is studying something on the display 106. The characteristics detected are a living body having at least one eye focused on the display 106. Another anatomical state is when the user 102 is interrupted. The characteristics detected are a living body having eyes diverted from the display 106. The last anatomical state is working. This anatomical state may be characterized by a living body having at least one eye focused on the display 106 and hands near a human input device, such as a keyboard 108 or mouse 110.

Alternatively, indicia of a user's body position may be derived from other sources. In one embodiment, a power management unit 224 may communicate with a video or digital camera. The camera may capture a series of images of the user 102 in close proximity to the display 106 and human input device 108, 110. The collector 302 may be configured to analyze the series of images and identify control points in the images.

Control points are points of reference that may be used to determine whether the object in the image is human, is moving, has head and/or eyes directed towards the display 106, and has his/her hands near the keyboard 108 or mouse 110. Points of reference may be wrists, eyes, shoulders, or the like.

By comparing a plurality of images, the collector 302 is able to detect motion as the position of the control points change. In addition, by comparing differences between images, the collector 302 is able to determine whether a user 102 is viewing a display. In this manner, the collector 302 may provide indicia of a user's body position similar to those provided by sensors 226 as discussed above.

Figure 5:
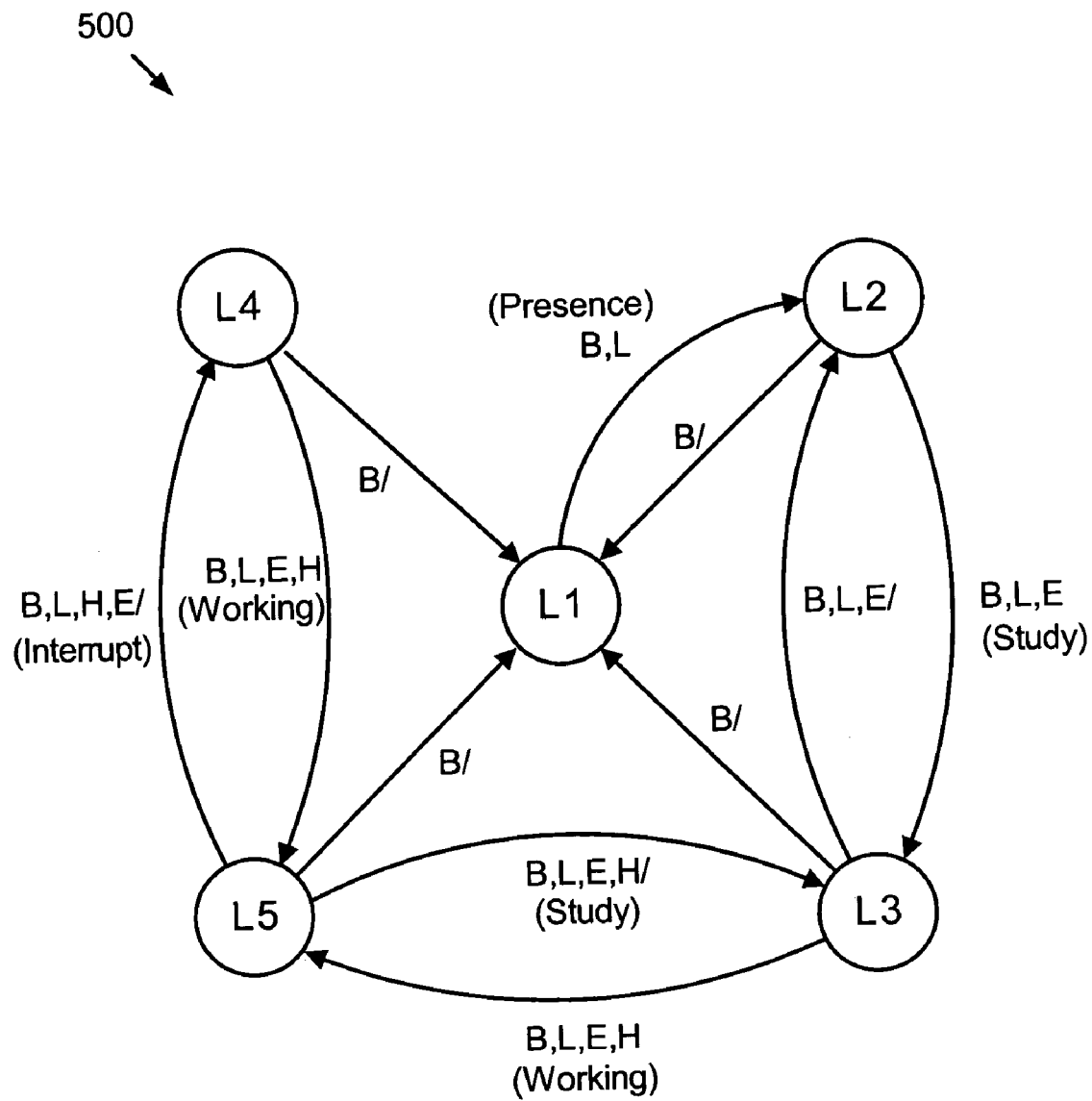
FIG. 5 is state diagram illustrating power states for one embodiment of the present invention.

FIG. 5 illustrates a state diagram 500 of power states and the characteristics that cause a change in power state. The state diagram is a directed graph comprising nodes and arrows. Each node represents one of five different power states similar to those discussed in relation to chart 400, namely L1, L2, L3, L4, and L5. The arrows represent one or more characteristics which, if present or absent, cause the power management unit 224 to transition an electronic device, such as a laptop 104, to a different power state. The absence of a characteristic of a user 102 is indicated by a "/" symbol. The characteristics illustrated include whether a human shaped body is present (B), whether the present body is living (L), whether a user 102 is focusing an eye on a display 106 (E), and whether a user 102 has his/her hands near a human input device (H).

A few examples of power state transitions will be described here. However, those of skill in the art will recognize that many possible power state transitions may not be illustrated or may exist even though not explicitly discussed.

Suppose a laptop 104 implementing the present invention begins in power state L1. Then, a user 102 approaches the laptop 104. Sensors 226 immediately detect the presence of an object resembling a user 102 (B). In addition, other sensors 226 indicate that the approaching object is alive (L). Accordingly, the power management unit 224 transitions the laptop 104 to power state L2.

Further suppose that the user 102 focuses his/her eyes on the display 106 (E). A sensor 226 detects the eye focus, so the laptop 104 transitions to power state L3. Next, suppose the user 102 places his/her hands on the keyboard 108 (H). The laptop 104 transitions to power state L5. The laptop 104 is fully powered and prepared to interact with the user 102. Preferably, the transitions between power states L1, L2, L3, and L5 occur quickly such that the user 102 experiences minimal latency delay waiting for the laptop 104 to power up or power down. In certain embodiments, the approach of the user 102 is detected early enough that transitions to higher power states occur without significantly increasing the delay experienced by a user 102 beyond that experienced using conventional power management systems.

Transitions between power states L1–L5 may occur both to power up and power down the laptop 104. Transitions between power states L1–L5 may be conditioned on the user characteristics presented as well as the previous power state. For example, if a user 102 is using the laptop 104 to conduct Internet research, the user 102 may sit in front of the laptop 104 viewing the display 106 and using the mouse 110 and/or keyboard 108. Once the user 102 finds something of interest, the user 102 may remove his/her hands from the keyboard 108 or mouse 110 and view the display 106 for an extended period reading text.

In such an example, once the hands are removed, the laptop 104 may transition from L5 to L3. The change in characteristics causes the laptop 104 to actively transition to a next lower power state L3. Similarly, if the hands are again placed on the keyboard 108, the laptop 104 transitions to power state L5. The latency delay in waiting for the laptop 104 to transition to L5 is minimal because few subsystems must be powered up to make the transition. Accordingly, the change in power states may be unnoticed by the user 102.

In one embodiment, sensors 226 constantly provide indicia to the collector 302. The determination module 304 may use the constant information to gather more information than simply whether a user 102 has positioned body parts in certain locations. (i.e. hands over the keyboard.) In the example above, indicia provided by the collector 302 may include changes in the anatomical position of the user's body parts. For example, movement of hands away from the keyboard may indicate that the user 102 intends to stop typing for some period. Consequently, the power management unit 224 may transition the laptop 104 to lower power state.

In another example, intermediate power states may be skipped depending on user body position characteristics. For example, suppose a user 102 is working at the laptop 104. The power state is L5. Next, the user 102 leaves the room. The laptop 104 transitions directly from power state L5 to power state L1. In this manner, power is conserved, while imposing a minimal inconvenience on the user 102.

In certain embodiments, the determination module 304 may include indicators indicative of user habits. For example, if a user 102 habitually leaves the laptop 104 at about the same time each day, the indicia that the user 102 has left together with other indicators such as the time of day, frequency, and duration of such an action may be included by the determination module 304 in selecting an appropriate power state. So, if the user leaves each day at about 9:35 for a drink of water and returns in thirty seconds, the power management unit 224 may transition the laptop 104 to a power state less than L5 but greater than L1, instead of transitioning directly to L1 because the user 102 has left.

In one embodiment, the determination module 304 is configured to periodically re-evaluate new indicia of the user's body condition and the current power state. In this manner, the power management unit 224 may transition to the lowest power state L1 without user involvement.

Figure 6:
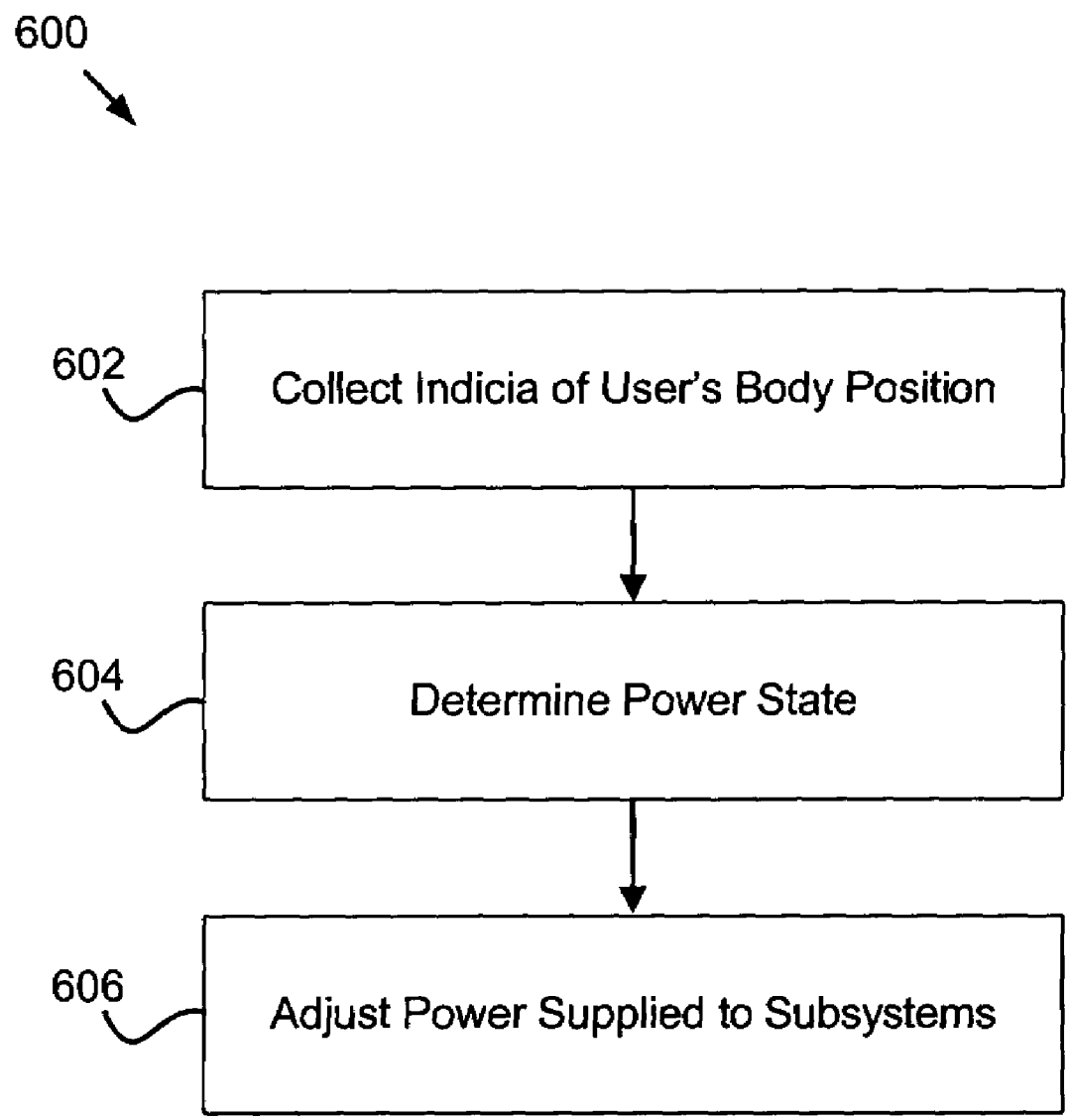
FIG. 6 is a schematic flow chart diagram illustrating a method for power adjustment in an electronic device.

FIG. 6 illustrates a flow chart of a method 600 for autonomic power adjustment in an electronic device. The method 600 begins by collecting indicia of a user's body position in relation to an electronic device 104. Preferably, sensors 226 provide signals in response to detecting particular characteristics regarding a user's position. Alternatively, existing components such as a camera may be used to collect indicia based on a series of images of a user in the vicinity of the electronic device.

Next, a power state for the electronic device is determined 604 based on the indicia. Preferably, the indicia provide sufficient information to make the determination. Otherwise, the electronic device may maintain the current power state.

Next, the power supplied to various subsystems of the electronic device is selectively adjusted 606. As discussed above, which subsystems experience an increase or decrease in power supplied depends on the characteristics detected by the sensors 226. In certain embodiments, the electronic device 104 transitions between a plurality of power states in response to a plurality of anatomical states of the user 102. In this manner, certain subsystems may be powered only when actually being used by a user 102. For example, a backlight of a display 106 may be powered only when a user 102 directs his/her eyes toward the display 106.

In certain embodiments, the determination module 304 is configured to adapt to specific behavior patterns of a user 102. The determination module 304 may combine these behavior patterns with indicia of a user's body position to determine which power state to select. In one embodiment, the power state is selected such that the latency period for transitioning into the power state is less than the time the user is expected to maintain a body position indicative of that power state.

For example, suppose a user powers up a laptop 104 implementing one embodiment of the present invention. The laptop 104 enters power state L5. Further, suppose this user habitually leaves the laptop for about forty-five seconds to retrieve a cup of coffee each morning. For this particular laptop 104, the latency period between L1 and L5 may be about fifty seconds. Leaving the laptop 104 would ordinarily cause the laptop 104 to enter power state L1. However, in certain embodiments, the time interval for retrieving the coffee is measured and recorded. Because the latency period exceeds the coffee retrieval time interval, the determination module 304 may not select power level L1. Instead, power state L3 or L4 may be selected.

Figure 7:
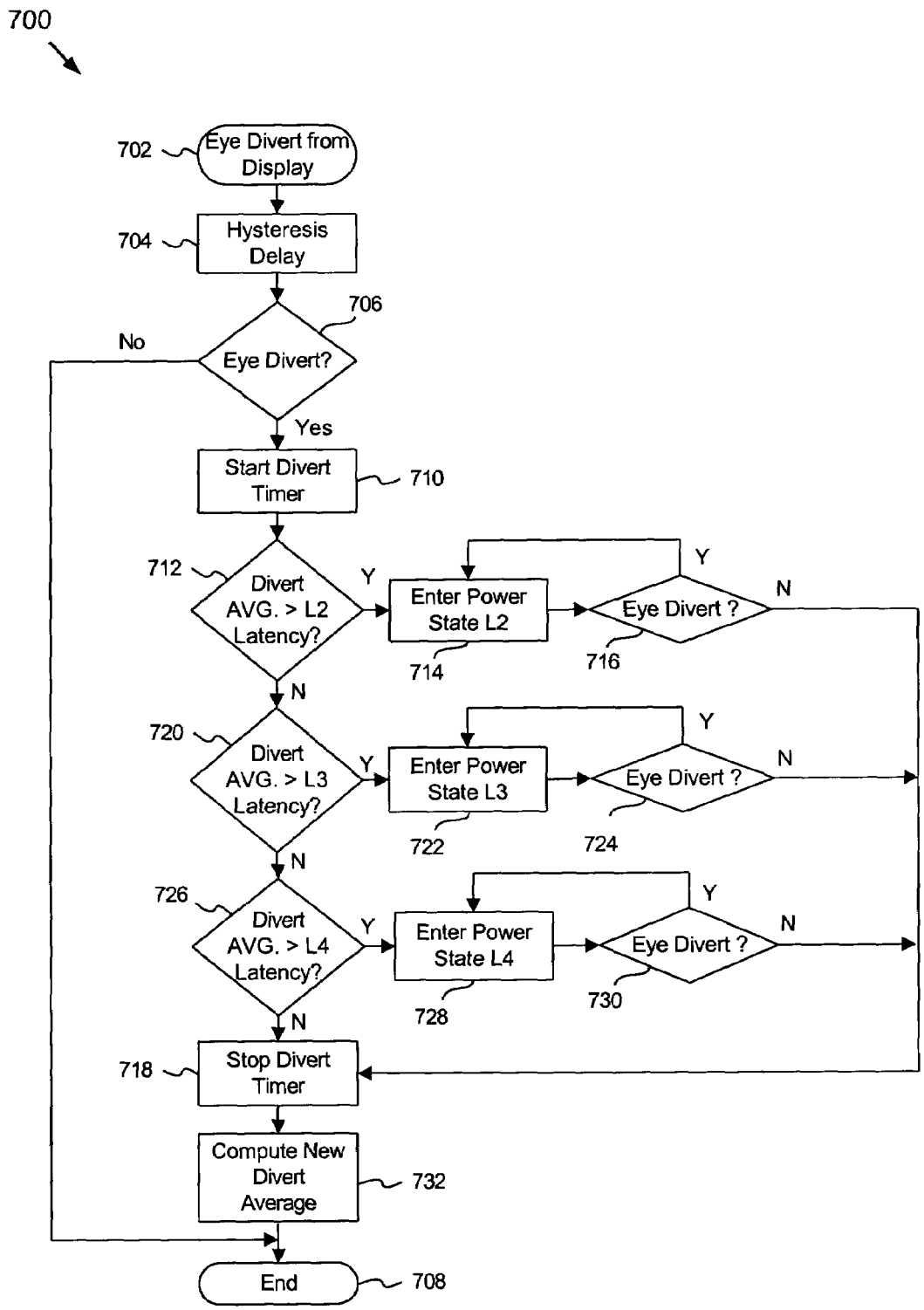
FIG. 7 is a schematic flow chart diagram illustrating a method for power adjustment in an electronic device such that selection of a next power state adapts to a user's behavior.

FIG. 7 illustrates a representative example of a method 700 for autonomic power adjustment in which the power state selected is adapted based on user behavior. The method 700 measures the time interval that a user maintains a specific body position. The next power state is then selected such that the time interval exceeds the latency period associated with the selected state.

For example, if a user's body position comprises whether or not the user's eyes are focused on the display 106. If the eyes are focused and the hands are removed from the keyboard 108, the user 102 may be studying the display 106. If the eyes divert from the display 106 and the hands remain near the keyboard 108, the user 102 may be interrupted.

Preferably, such a body position causes the backlight of the display 106 to dim. Power states L1–L4 include dimming the display 106. The method 700 selects one of these power states such that latency is minimized yet as much power is conserved as possible. In one embodiment, the method associates a time interval with the body position characteristic. In method 700, the body position characteristic is "Eyes diverted" and the time interval is labeled a divert period.

The method 700 begins when the user 102 diverts 702 his/her eyes from the display 106. Eyes may divert for very small periods of time due to blinking, exhaustion, etc. Therefore, the method 700 includes a wait period known as a hysteresis delay 704. Once the hysteresis delay expires, a sensor 226 determines 706 whether the user's eyes have diverted from the display 106. If not, the method 700 ends 708. If so, a divert timer is started 710.

Next, a determination 712 is made whether a divert average exceeds a latency period for one of the lower power states, for example L2. A divert average may be maintained by the determination module 304 and associated with a particular body position characteristic. The divert average is an average of a predetermined number of previous divert periods. In one embodiment, three successive divert periods are averaged together to compute the divert average.

If the divert average exceeds a latency period for power state L2, this means the user 102 is expected to keep his/her eyes diverted long enough that the laptop 104 can transition to power state L2 before the user 102 redirects his/her eyes on the display 106. Accordingly, if the divert average exceeds the L2 latency period, the laptop 104 transitions 714 to power state L2. Then, a determination 716 is made whether the user 102 still has his/her eyes diverted. If so, the laptop 102 remains in power state L2. If not, the current divert timer is stopped 718.

If the divert average does not exceed a latency period for power state L2, a determination 720 is made whether the divert average exceeds a latency period for power state L3. Steps 722–730 illustrate that similar steps to those described in relation to steps 712–716 are followed for each successively higher power state L3 and L4.

If the divert average does not exceed a latency period for power state L4, a power state transition would be inefficient. Therefore, the method 700 continues by stopping 718 the divert timer. Next, a new divert average is computed 732 using the newest divert timer value.

FIG. 7 illustrates one method 700 of using user body position characteristics to enable the present invention to adapt to different user behaviors. By using averages, the method 700 allows adaptation due to changes in the habits of a user and the corresponding changes in the time intervals for the body position characteristics. Those of skill in the art will recognize that the method 700 is one of many methods that may be used to allow the present invention to adapt to behavior of the user to optimize power management. For example, a body characteristic such as hands near a mouse 110 may be associated with a timer such that certain lower power states are not selected even though the user 102 appears to be using the mouse 110, when the user 102 is, in fact, resting a hand on the mouse 110 out of habit.

Of course, adaptive features of the present invention are not limited to those described above. Other adaptive features are considered within the scope of this invention. Specifically, the control module 304 may consider other factors such as the time of day. Adaptive features such as averages may change based on the hour, part of the day, day of the week, or the like. Consequently, the present invention may be constantly adapting to behavior of one or more users 102.

The power management unit 224 may manage all power consumption for an electronic device. In certain embodiments, the power management unit 224 is configured to cooperate with conventional power management systems which use internal timers. For example, the power management unit 224 may dim a backlight of a display 106 and a conventional power management system may shut-off power to the display 106 once an internal timer expires.

In summary, the present invention provides an apparatus, system, and method for autonomic power adjustment in an electronic device in response to movements of a user in relation to the electronic device. The present invention adjusts the power level between a plurality of power levels to minimize power-up and power-down latency. The present invention manages power based on indications from a user beyond presence or absence to optimize power use and adapts power management to use habits of the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for autonomic power adjustment in an electronic device, comprising:
   a collector configured to collect indicia representative of one of a plurality of anatomical states associated with different user body positions in relation to an electronic device for a user who maintains close proximity to the electronic device;
   a determination module configured to determine a power state for the electronic device based on the indicia, the power state is representative of one of a plurality of hierarchical power states; and
   a power control module configured to selectively adjust power supplied to subsystems of the electronic device to transition to the determined power state.

2. The apparatus of claim 1, wherein the determination module is further configured to select a lowest power state in response to the indicia.

3. The apparatus of claim 1, wherein the determination module is further configured to select a lower power state in response to the indicia.

4. The apparatus of claim 1, wherein the determination module is further configured to measure a time interval that a user maintains a body position and select the power state such that the time interval exceeds a latency period associated with the selected power state.

5. The apparatus of claim 1, wherein the user's body position comprises focusing an eye on a display coupled to the electronic device to study the display.

6. The apparatus of claim 1, wherein the collector is further configured to capture a series of images of the user in proximity to the electronic device, identify control points in the images, and determine indicia of a user's body position based on the control points.

7. The apparatus of claim 1, wherein the collector is further configured to poll a plurality of sensors configured to detect characteristics of the user's body position.

8. The apparatus of claim 1, wherein the collector is further configured to receive signals from sensors that continuously monitor characteristics of a user's body position.

9. A system for autonomic power adjustment, comprising:
   a display and human input device coupled to a processing subsystem;
   a power regulator configured to control a power supply to the display, human input device, and processing subsystem;
   one or more sensors configured to detect characteristics of a user's body position while the user's body is positioned in close proximity to the display or human input device;
   a collector in communication, with the sensors and configured to collect indicia representative of one of a plurality of anatomical states associated with different user body positions in relation to the display or human input device;
   a determination module configured to determine a power state based on the indicia, the power state is representative of one of a plurality of hierarchical power states; and
   a power control module configured to selectively adjust power supplied to the display, human input device, and processing subsystem to transition to the determined power state.

10. The system of claim 9, wherein the determination module is further configured to select a higher power state in response to the indicia.

11. The system of claim 9, wherein the determination module is further configured to measure a time interval that a user maintains a body position and select the power state such that the time interval exceeds a latency period associated with the selected power state.

12. The system of claim 11, wherein the determination module is further configured to adapt to changes in the time interval such that the optimal power state is selected.

13. The system of claim 9, wherein the user's body position comprises focusing an eye on the display.

14. The system of claim 9, further comprising a digital camera configured to capture a series of images of the user in proximity to the display and human input device, the collector further configured to identify control points in the images and determine indicia of a user's body position based on the control points.

15. A method for autonomic power adjustment in an electronic device, comprising:
- collecting indicia representative of one of a plurality of anatomical states associated with different user body positions in relation to an electronic device while the user is in close proximity to the electronic device;
- determining a power state for the electronic device based on the indicia, the power state is representative of one of a plurality of hierarchical power states;
- measuring a time interval that a user maintains a body position such that the power state is determined such that the time interval exceeds a latency period associated with the determined power state; and
- selectively adjusting power supplied to subsystems of the electronic device to transition to the determined power state.

16. The method of claim 15, wherein determining a power state further comprises selecting a lowest power state in response to the indicia.

17. The method of claim 15, wherein determining an power state further comprises selecting a lower power state in response to the indicia.

18. The method of claim 15, wherein the user's body position comprises focusing an eye on a display coupled to the electronic device to study the display.

19. The method of claim 15, wherein collecting indicia of a user's body position further comprises:
- capturing a series of images of the user while the user remains in close proximity to the electronic device;
- identifying control points in the images; and
- determining indicia of a user's body position based on the control points.

20. The method of claim 15, wherein collecting indicia of a user's body position further comprises polling a plurality of sensors configured to detect characteristics of the user's body position.

21. The method of claim 15, wherein collecting indicia of a user's body position further comprises receiving signals from sensors that continuously monitor characteristics of a user's body position.

22. An article of manufacture comprising a program storage medium readable by a processor and embodying one or more instructions executable by a processor to perform a method for autonomic power adjustment in an electronic device, the method comprising:
- collecting indicia representative of one of a plurality of anatomical states associated with different user body positions in relation to an electronic device while the user is in close proximity to the electronic device, the indicia polled from a plurality of sensors configured to detect characteristics of the user's body position;
- determining a power state for the electronic device based on the indicia, the power state is representative of one of a plurality of hierarchical power states;
- measuring a time interval that a user has historically maintained a body position such that the power state is determined such that the time interval exceeds a latency period associated with the determined power state; and
- selectively adjusting power supplied to subsystems of the electronic device to transition to the determined power state.

23. An apparatus for autonomic power adjustment in an electronic device, comprising:
- means for collecting indicia representative of one of a plurality of anatomical states associated with different user body positions in relation to an electronic device while the user is in close proximity to the electronic device, the indicia polled from a plurality of sensors configured to detect characteristics of the user's body position;
- means for determining a power state for the electronic device based on the indicia, the power state is representative of one of a plurality of hierarchical power states;
- means for measuring a time interval that a user maintains a body position such that the power state is determined such that the time interval exceeds a latency period associated with the determined power state; and
- means for selectively adjusting power supplied to subsystems of the electronic device to transition to the determined power state.

* * * * *